United States Patent [19]

Watanabe

[11] Patent Number: 5,262,462
[45] Date of Patent: Nov. 16, 1993

[54] STICK ADHESIVES HAVING READHESION PROPERTIES

[75] Inventor: Tetsuya Watanabe, Kashiwara, Japan

[73] Assignee: Fuekinori Kogyo Kabushiki Kaisha, Osaka, Japan

[21] Appl. No.: 902,399

[22] Filed: Jun. 17, 1992

Related U.S. Application Data

[63] Continuation of Ser. No. 551,415, Jul. 11, 1990, abandoned, which is a continuation-in-part of Ser. No. 281,255, Dec. 7, 1988, abandoned.

[51] Int. Cl.$^5$ ............................................. C08F 110/02
[52] U.S. Cl. .................................... 524/284; 524/315; 524/556; 524/577; 525/227; 525/241
[58] Field of Search .................................. 524/284, 315

[56] References Cited

U.S. PATENT DOCUMENTS

| | | | |
|---|---|---|---|
| 3,576,776 | 12/1968 | Muszik et al. | 524/555 |
| 4,288,480 | 9/1981 | Grzywinski et al. | 524/505 |
| 4,338,414 | 7/1982 | Acharya et al. | 525/126 |
| 4,361,672 | 11/1982 | Agarwal et al. | 525/54.5 |
| 4,367,113 | 1/1983 | Karim et al. | 524/271 |
| 4,644,026 | 2/1987 | Shuman et al. | 524/270 |
| 4,716,189 | 12/1987 | Gollub et al. | 524/284 |
| 4,946,301 | 8/1990 | Palm | 524/284 |

Primary Examiner—John C. Bleutge
Assistant Examiner—Mark Sweet
Attorney, Agent, or Firm—Wenderoth, Lind & Ponack

[57] ABSTRACT

Stick adhesives gelatinized by a gel-forming agent having readhesion properties and a sheet of paper adhered to an adherend with the adhesives can be peeled from the adherend and thereafter can be readhered on an adherend and consecutive cyclic usage of adhesion-removal-readhesion can be attained, which comprise a mixture of an adhesive component which is soluble or dispersible in a liquid medium, alkali metal salts or ammonium salts of aliphatic carboxylic acids having carbon atoms of 8 to 36 as a gelatinizer and at least one resin component as a modifier selected from the group consisting of polystyrene resins having a melting point of 0° C. to 100° C. and rosin resins, polyisobutylene resins and polybutene resins having a softening point of 0° C. to 100° C.

4 Claims, No Drawings

STICK ADHESIVES HAVING READHESION PROPERTIES

This application is a continuation of now abandoned application Ser. No. 07/551,415, filed Jul. 11, 1990, which application is, in turn, a continuation-in-part of now abandoned application Ser. No. 07/281,255, filed Dec. 7, 1988.

BACKGROUND OF THE INVENTION

1. Field of the Invention

This invention relates to solid adhesives of stick type having readhesion properties and more particularly to stick adhesives having readhesion properties which enable sheets to be removably adhered to an adherend in such a cyclic manner as adhesion-removal-readhesion.

2. Prior Art

There have been provided liquid adhesives containing organic solvents, which enable sheets to be removably adhered to an adherend. For example, they have been used when printing art works are made.

On the other hand, solid adhesives of lip stick type have been provided, for example by Muszik et al as shown in the Japanese patent publication No. 47-25448 and the corresponding U.S. Pat. No. 3,576,776, which comprise adhesive substances which are soluble or dispersible in a liquid medium such as water, water-miscible organic solvents or aqueous solution thereof and alkali metal salts or ammonium salts of aliphatic carboxylic acids as a gelatinizer.

The above liquid adhesives, however, have such drawbacks as environmental pollution caused by the volatilization of organic solvents which induces sanitary problems, fire risk and so forth.

Solid adhesives mentioned above do not possess readhesion properties, so that the sheets adhered to an adherend by applying said solid adhesives can not be removed from the adherend without damaging the sheets or adherend. Accordingly, once the sheets are peeled off from the adherend, readhesion can not be attained.

Stick adhesives which enable articles to be removably bonded to substrates have been disclosed by Gollub et at in the U.S. Pat. No. 4,716,189. An aqueous dispersion of polyethylene ethyl is employed for attaining said purpose. Said stick adhesives would be helpful for temporarilly adhereing the sheets to an adherend in such a condition that the sheets can be removed from the adherend later. The sheets thus removed from the adherend, however, would not be able to be adhered again to the adherend. Namely, consecutive cyclic usage of adhesion-removal-readhesion would not be able to be attained by said stick adhesives.

On the other hand, blends of polymers including a tackifying resin have been disclosed in the U.S. Pat. No. 4,367,113, which have good adhesion to a number of materials and are suitable for use in the manufacture of laminated sheet constructions as well as for employment as hot melt adhesives. For example, the powdered blend of polymers are distributed over one sheet of polyester film and a second sheet of polyester film is laid on the assembly. Then the assembly is subjected to heat and pressure to obtain a laminated structure of two sheets which are adhered strongly to each other. Removability and readhesion, however, can not be obtained. Stick adhesives gelatinized by a gel-forming agent which can be used in the same manner as in the conventional solid adhesives have not been obtained.

SUMMARY OF THE INVENTION

It is therefore an object of the present invention to provide stick adhesives having readhesion properties which enable sheets to be removably adhered to an adherend in such a cyclic manner as adhesion-removal-readhesion and which are free from sanitary problems, fire risk and so forth.

Our consecutive researches for solving the above problems have revealed that such solid adhesives as disclosed in the U.S. Pat. No. 3,576,776 can be modified by additionally employing at least one resin selected from the group consisting of polystyrene resins having a melting point of 0° C. to 100° C. and rosin resins, polyisobutylene resins and polybutene resins having a softening point of 0° C. to 100° C. By employing such a modifier as the additional component, the adhesives have shown good adhesion even after being dried, which can not be attained by the conventional solid adhesives and stick adhesives as mentioned above. Then it would be said that the readhesion properties of adhesives can be confirmed by whether the adhesives applied to sheets and dried maintain good adhesive power for further adhereing the sheets to an adherend.

In accordance with the present invention, the stick adhesives having readhesion properties, then, comprise a mixture of an adhesive component which is soluble or dispersible in a liquid medium selected from the group of water, water-miscible organic solvents and aqueous solution thereof, an alkali metal or ammonium salt of an aliphatic carboxylic acid having 8 to 36 carbon atoms as a gelatinizer and at least one resin component as a modifier selected from the group consisting of a polystyrene resin having a melting point of 0° C. to 100° C., a rosin resin, a polyisobutylene resin and a polybutene resin each having a softening point of 0° C. to 100° C. The mixture may be poured into a lip stick container to set up as in the same manner in the conventional solid adhesives. The stick adhesives thus obtained can be used in the same manner as in the conventional solid adhesives.

The modifier, i.e. at least one resin component selected from the group consisting of polystyrene resins having a melting point of 0° C. to 100° C. and rosin resins, polyisobutylene resins and polybutene resins having a softening point of 0° C. to 100° C. provide the stick adhesives with readhesion properties. Namely, the adhesives do not remain on an adherend when the sheets adhered to an adherend by the adhesives applied are peeled off from the adherend and the sheets having the adhesives thereon can be further adhered to an adherend. It is confirmed that the stick adhesives obtained shows good adhesion even after being dried as described hereinafter in connection with the preffered embodiments. Thus the stick adhesives in accordance with the present invention can be used for consecutive cyclic usage of adhesion-removal-readhesion of the sheets to an adherend.

As to the adhesion power, it is preferred that the stick adhesives have the adhesion power after being dried of more than 70 g/25 mm for 180° peeling of two sheets of paper adhered to each other.

It is preferred that the gel strength of the stick adhesives is more than 5,000 g in view of shape retention and spreadability.

The stick adhesives obtained being of a solid type, there occur no sanitary problems such as environmental pollution as in the case of the conventional readherent liquid adhesives. There is also no fire risk.

DETAILED DESCRIPTION OF THE INVENTION

The present invention will now be described more specifically in accordance with the preferred embodiments.

Embodiment 1

In a reactor provided with agitator, reflux condenser, dropping device and thermometer, 11 parts of myristic acid were poured and 3 parts of 35% aqueous sodium hydroxide were dropped to prepare a sodium myristic acid. 34 parts of acrylic emulsion adhesives (NIKASOL TS-971, trade mark of Nippon Carbide Kogyo Kabushiki Kaisha, 65 p.b.w. emulsion mainly composed of acrylate 2-ethyl-hexyl ester) and 14 parts of polystyrene resin (PICCOLASTIC A-5, trade mark of HERCULES INCORPORATED, chemical formula:

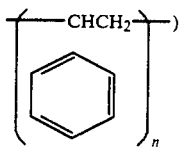

were added while being mixed and stirred well at a temperature of 80° to 90° C. Then the mixture was poured into a container such as being used for a lip stick to set up and thereby the stick adhesives in accordance with the present invention were obtained.

The adhesives thus obtained were applied on printing paper A of JIS P 3101 (Japanese Industrial Standard) and dried. Another printing paper A was adhered to said applied paper. Then a peel test was conducted in accordance with JIS Z 0237. The adhesive power for 180° peeling was 80 g/25 mm which was suitable for removability and readhesion. The gel strength was 6,000 g.

Embodiment 2

Sodium myristic acid was prepared in the same manner as in Embodiment 1. 34 parts of acrylic emulsion adhesives (NIKASOL TS-971) and 10 parts of methyl ester of hydrogenated rosin (HERCOLYN D, trade mark of HERCULES INCORPORATED, prepared by hydrogenating methyl ester of rosin obtained by the reaction of rosin and methyl alcohol. Chemical formula:

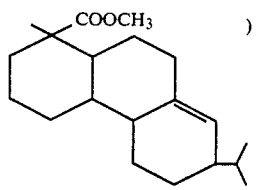

were added while being mixed and stirred well at a temperature of 80° to 90° C. Then the mixture was poured into a lip stick container to set up and thereby the stick adhesives having readhesion properties in accordance with the present invention were obtained.

The adhesives thus obtained were applied on printing paper A of JIS P 3101 and dried. Another printing paper A was adhered to said applied paper. Then a peel test was conducted in accordance with JIS Z 0237. The adhesive power for 180° peeling was 75 g/25 mm which was suitable for removability and readhesion. The gel strength was 5,500 g.

Polystyrene resin employed in Embodiment 1 has a melting point of 0° C. to 100° C. Rosin resin employed in Embodiment 2 has a softening point of 0° C. to 100° C. Ester gum is also available as a rosin resin.

Alkali metal salts or ammonium salts of aliphatic carboxylic acids having carbon atoms of 8 to 36 employed in the present invention are preferably sodium salts of aliphatic carboxylic acids having carbon atoms of 12 to 18, for example, sodium salts of lauric acid, myristic acid, palmitic acid, stearic acid or optional mixture thereof.

Although one kind of resin was employed in the above Embodiments, optional comination of the above mentioned resins are also available.

COMPARATIVE EXAMPLE

For comparison purpose, solid adhesives which contains no resin of the present invention were prepared as follows.

In a reactor provided with agitator, reflux condenser, dropping device and thermometer, 11 parts of myristic acid were poured and 3 parts of 35% aqueous sodium hydroxide were dropped to prepare a sodium myristic acid. 34 parts of acrylic emulsion adhesives (NIKASOL TS-971) were added while being mixed and stirred well at a temperature of 80° to 90° C. Then the mixture was poured into a lip stick container to set up and thereby solid adhesives were obtained.

The adhesives obtained were applied on printing paper A of JIS P 3101 and dried. Another printing paper A was adhered to said applied paper. Then a peel test was conducted in accordance with JIS Z 0237. The adhesive power for 180° peeling was 0 g/25 mm. Thus the solid adhesives containing no resin of the present invention were not suitable for adhesion-removal-readhesion purpose.

Stick adhesives having the following ingredients have been prepared.

| Ingredients | A | B (% by weight) |
| --- | --- | --- |
| Acronal V 205 | 24.0 | 24.0 |
| Vinacryl 4512 | 36.0 | 36.0 |
| Epotal 181D | 9.0 | 0 |
| Polyvinylpyrrolidone | 4.0 | 4.0 |
| Myristic acid | 9.0 | 9.0 |
| Pluronic F 87 | 4.0 | 4.0 |
| Propylene-glycol | 5.0 | 5.0 |
| Water | 6.0 | 15.0 |
| Sodium hydroxide | 3.0 | 3.0 |
| | 100.0 | 100.0 |

Acronal V 205: Trade mark of BASF 70% aqueous dispersion of carboxylated octyl ester of acrylic acid
Vinacryl 4512: Trade mark of Vinamul GmbH 45% aqueous dispersion of carboxylated ethyl hexl ester of acrylic acid
Epotal 181 D: Trade mark of BASF 40% aqueous dispersion of polyethylene
Pluronic F 87: Trade mark non-ionic emulsifiers The mixture prepared in a like manner as above was poured into a lip stick container to set up and thereby solid adhesives were obtained. Then, adhesive power after being dried and gel strength of the adhesives were valued in accordance with the following conditions.

Adhesive Power

Valued by 180° peel strength of adhesives in accordance with JIS K 6854 which corresponds to ASTM D 903-49(1965). Test pieces are printing paper A of JIS P 3101 and stainless steel plate as prescribed. The above adhesives were applied to the printing paper A and after being dried said paper was adhered to the stainless steel plate, and 180° peel strength was valued.

Gel Strength

Valued by RHEO METER NRM-2010-CW of FUDOH KOGYO CO., LTD. using a disk adapter of 15 mm diameter at 25° C. with a compression speed 2 cm/min.

The results obtained are as follows.

|  | A | B |
| --- | --- | --- |
| Adhesive power (g/25 mm) | 13 | 12 |
| Gel strength (g) | 1,900 | 2,400 |

The above results show that the stick adhesives obtained are poor in the adhesive power when the adhesives are applied after being dried. The stick adhesives obtained would be applicable for temporary adhesion purpose without drying after application, namely the usage for temporarily adhering a paper to an adherend with removability. After removal from an adherend said paper must be abandoned, because no adhesive power remains. Accordingly the stick adhesives obtained as above can not be used for consecutive cyclic usage of adhesion-removal-readhesion.

I claim:

1. A stick adhesive having readhesion properties which enables sheets to be removably adhered to an adherend in the cyclic manner of adhesion-removal-readhesion, comprising a mixture of (a) an acrylic ester emulsion adhesive component which is gelatinized by the gelatinizer component (b) and which is soluble or dispersible in a liquid medium selected from the group consisting of water, a water-miscible organic solvent and an aqueous solution thereof, (b) an alkali metal or ammonium salt of an aliphatic carboxylic acid having 8 to 36 carbon atoms as a gelatinizer and (c) as a modifier a polystyrene resin having a melting point of 0° C. to 100° C.

2. A stick adhesive having readhesion properties as claimed in claim 1, wherein said adhesive has the adhesion power after being dried of more than 70 g/25 mm for 180° C. peeling of two sheets of paper adhered to each other.

3. A stick adhesive having readhesion properties as claimed in claim 1, wherein said adhesive has a gel strength of more than 5,000 g.

4. A stick adhesive having readhesion properties which enables sheets to be removably adhered to an adherend in the cyclic manner of adhesion-removal-readhesion, comprising (a) a mixture of an acrylic emulsion adhesive including acrylate 2-ethyl-hexyl ester which is soluble or dispersible in a liquid medium selected from the group consisting of water, a water-miscible organic solvent and an aqueous solution thereof, (b) an alkali metal or ammonium salt of an aliphatic carboxylic acid having 8 to 36 carbon atoms as a gelatinizer and (c) as a modifier a polystyrene resin having a melting point of 0° C. to 100° C.

* * * * *